United States Patent [19]
Mochizuki et al.

[11] Patent Number: 5,427,829
[45] Date of Patent: Jun. 27, 1995

[54] LIQUID CRYSTAL DISPLAY DEVICE

[75] Inventors: Akihiro Mochizuki, Atsugi; Masayuki Iwasaki, Saitama; Mitsuaki Hirose, Tatebayashi; Shunsuke Kobayashi, Tokyo, all of Japan

[73] Assignee: Fujitsu Limited, Kawasaki, Japan

[21] Appl. No.: 188,127

[22] Filed: Jan. 28, 1994

Related U.S. Application Data

[63] Continuation of Ser. No. 962,012, Oct. 15, 1992, abandoned, which is a continuation of Ser. No. 579,040, Sep. 7, 1990, abandoned.

[30] Foreign Application Priority Data

Sep. 7, 1989 [JP] Japan .................................. 1-232449

[51] Int. Cl.⁶ ............................................ G02F 1/1337
[52] U.S. Cl. .......................................... 428/1; 359/75
[58] Field of Search ................................ 428/1; 359/75

[56] References Cited

U.S. PATENT DOCUMENTS 3,944,332  3/1976  Tutihasi et al. .............. 250/213 R
4,494,824  1/1985  Nakamura et al. ................. 428/1

FOREIGN PATENT DOCUMENTS 62-295028  12/1987  Japan .
63-121020   5/1988  Japan .
1-101389    4/1989  Japan .

OTHER PUBLICATIONS

The Japanese Journal of Applied Physics, vol. 28, No. 1, 116–118(Jan. 1989), Nakaya et al.

*Primary Examiner*—Alexander S. Thomas
*Attorney, Agent, or Firm*—Staas & Halsey

[57] ABSTRACT

A liquid crystal display device which comprises an orientation film and at least one charge transporting material doped in the orientation film. The charge transporting material having an amount being sufficient to cause a leakage of an electric charge temporarily accumulated in the orientation film or a portion adjacent thereto, during an operation of the device, to thereby inhibit a formation of an electric bilayer in the device. Since the formation of an electric bilayer is inhibited, generation of crosstalk and reduction of display characteristics such as memory properties of the LC display device are effectively prevented.

13 Claims, 5 Drawing Sheets

LIQUID CRYSTAL DISPLAY DEVICE

This application is a continuation of U.S. patent application Ser. No. 07/962,012, filed Oct. 15, 1992, now abandoned, which is a continuation of application Ser. No. 07/579,040, filed Sep. 7, 1990, now abandoned.

BACKGROUND OF THE INVENTION

1. Field of the Invention

The present invention relates to a liquid crystal display device, and more particularly, to a liquid crystal display device containing an orientation film having one or more charge transporting materials (hereinafter CTM) doped therein, and thus no crosstalk occurs due to the formation of an electric bilayer in the liquid crystal medium of the liquid crystal (hereinafter LC) device. Since no crosstalk occurs, in addition to the general advantages of the LC device itself such as a reduced area of installation, less eyestrain and lower consumption of electric power, the LC device of the present invention can be widely used as a display element or panel in electric devices, i.e., office automation (hereinafter OA) devices such as word processors, lap top and personal computers, and work stations, etc. Especially, when a super twisted nematic (hereinafter STN) liquid crystal is used in the LC device, the device of the present invention will provide additional advantages such as a large-scale and high information content display, high contrast and high gradation display.

2. Description of the Related Art

Nowadays, many types of liquid crystal display (hereinafter LCD) devices are widely utilized as a display element in the OA devices. One such display device is a twisted nematic (hereinafter TN) liquid crystal display device which is now widely used in, for example, watches and electronic calculators. The TN-LCD device is generally driven at a high duty ratio of up to 1/100, but suffers from a defect in that the display area is gradually darkened or lightened with an increase of the display lines, and thus the characters and other information on the display area become difficult to read. This display defect is considered to be due to a poor electro-optical steepness of the TN liquid crystal, and is referred herein to as crosstalk of the first kind.

Recently, a new type of the liquid crystal display device, i.e., the super twisted nematic (STN) liquid display device, has been developed, and is now widely used in OA devices because of its excellent multiplexability. The dramatic improvement of the multiplexability of the STN-LC device solves the above-discussed problem of the crosstalk of the first kind, because the steepness in the electro-optical characteristic of the LC device is improved. Nevertheless, in addition to this effect, another kind of crosstalk, which will be referred herein to as crosstalk of the second kind, is sometimes observed in a highly multiplexed STN-LC device. The crosstalk of the second kind is particularly remarkable when specific voltage waveforms are applied to particular pixels. This second kind of crosstalk frequently appears when a line image is displayed or a highly symmetric fine image is displayed, and it is sometimes hard to recognize the displayed image. For example, solid lines in graphs or tables are displayed with a ghost image thereof extending from the end point of the solid lines. Further, in the case of Chinese characters (kanji): in the character "富" (Fu of Fujitsu Limited), for example, the lower portion "田" of Fu is not clearly displayed but appears as —■ (black box)—. Furthermore, if a drive voltage is controlled to exactly display the above character, the upper portion "⼕" of Fu is then changed to —⼕—. As will be described hereinafter, the second kind of crosstalk is considered to be due to a shifting of the transmittance (T)−drive or applied voltage (V) curve in the LC device. This crosstalk is unavoidable, even if the applied voltage has a relatively low value, because the transmittance is largely varied as a function of a shifting of the T−V curve. Since the second crosstalk is a critical problem for the STN-LC devices, there is a need for the provision of an improved STN-LC device not having this crosstalk problem.

In the present invention, the shifting of the T−V curve, and accordingly, the generation of the second crosstalk, can be prevented by using an orientation film and at least one charge transporting material doped therein. Nevertheless, there is no prior art teaching or disclosing the use of the charge transporting material-doped orientation film for the purpose of eliminating the second kind of crosstalk in the LC devices, and particularly, STN-LC devices, although some prior art teach the incorporation of additive(s) to an orientation film of the LC devices but for a different purposes from that of the present invention. For example, Japanese Unexamined Patent Publication (Kokai) No. 62-295028 concerns the improvement of an orientation film in the LC device, and teaches the formation of the orientation film from a polyimide having a specific structure, or a precursor thereof, and metal powders and/or electrically conductive organic compounds such as NMP-TCNQ, TTF-TCNQ, and charge transfer complexes. The resulting low resistance film effectively prevents an accumulation of electric charges due to an unevenness of the thickness of the orientation film and a change in color of color filters used in color LC devices. Further, Japanese Unexamined Patent Publication (Kokai) No. 63-121020 also concerns the improvement of the orientation film in the LC device, especially a ferroelectric LC device, and teaches a control of a conductivity of at least one orientation film to $1\times10^8$ Ωcm or less, by using 5% by weight or more of a conductive material such as carbon or metal particles (Au, Aq) in a resinous orientation film. The resinous orientation film effectively prevents a notable reduction of the display characteristics of the FLC device due to ionic contaminants generated in the LC layer as a function of the polarization charges of the LC molecules.

On the other hand, Kenji Nakaya et al., of Tokyo University of Agriculture and Technology teach in Japanese Journal of Applied Physics, Vol. 28, No. 1, 116 (1989) that the incorporation of charge transfer complexes in an orientation film of the FLC device effectively prevents an accumulation of electric charge in an area adjacent to the orientation film. Nevertheless, the charge transfer complexes have drawbacks such that they are chemically unstable and sensitive to water, and therefore, cannot be used in a polyimide, which is a typical orientation film material, and further, are liable to be changes with an elapse of time. The orientation film of the above prior art exhibits low electric resistivity under direct current electric field, so, the orientation film sacrifices the electrically insulating characteristic of the transparent electrode. On the other hand, the orientation film of the present invention which will be described hereinafter exhibits insulating characteristic under direct current electric field and electric conductive characteristic as a result of hopping conductivity under high frequency electric field such as pulse writing frequency. So, the orientation film does not sacrifice the insulating characteristic of the transparent electrode and can prevent the temporary accumulation of the electric charge.

SUMMARY OF THE INVENTION

In view of the above-described drawbacks of the prior art LC devices, a principal object of the present invention is to provide an improved LC display device in which the above-described crosstalk of the first and second kinds do not occur, even though a display capacity of the device is increased, and thus a duty ratio thereof is reduced to about 1/400, and at the same time, the quality of the displayed images is raised.

According to the present invention, the above object can be accomplished by adding a certain charge transporting material to an orientation film of the LC display device.

More particularly, the present invention resides in a liquid crystal display device which comprises an electrically conductive orientation film and at least one charge transporting material doped in the orientation film, the charge transporting material and an amount thereof being sufficient to cause a leakage of an electric charge temporarily accumulated in the orientation film or a vicinity thereof, during an operation of the device, to thereby inhibit a formation of an electric bilayer in the device.

Surprisingly, the liquid crystal display device according to the present invention can eliminate the crosstalk problems, especially crosstalk of the second kind, when the display is conducted at a large capacity and, for example, a low duty ratio of 1/400. The present invention can be effectively applied to FLC devices and other devices, in addition to the STN devices.

DESCRIPTION OF THE PREFERRED EMBODIMENTS

Figure 1:
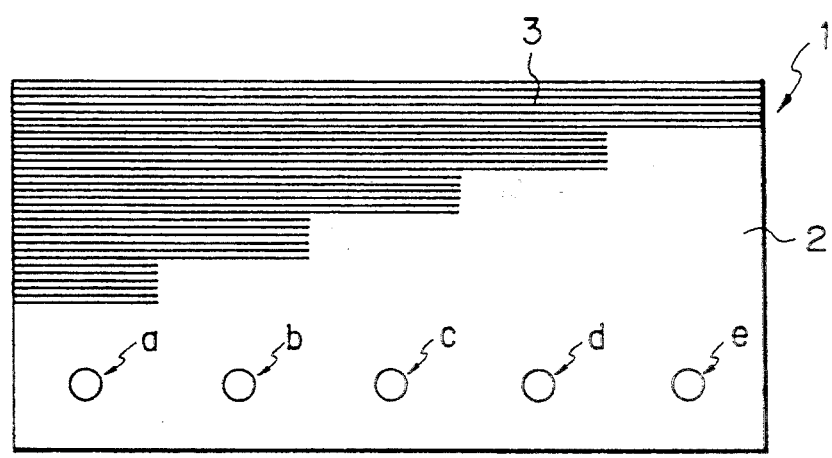
FIG. 1 is a schematic view showing the measurement of the transmittance in different background sites of the LC device and at different applied voltages.
Figure 2:
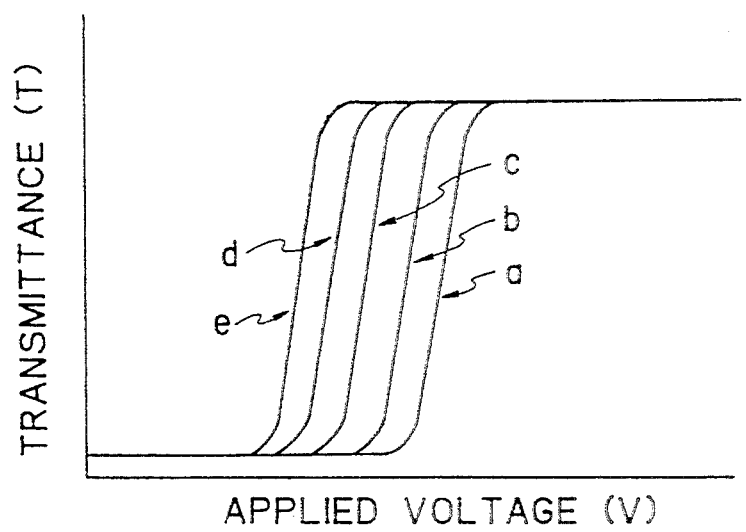
FIG. 2 is a graph showing the relationship between the applied voltage and transmittance obtained from the measurement of FIG. 1.

As previously described, according to the present invention, the crosstalk of the second kind and the crosstalk of the first kind can be prevented by adding a certain charge transporting material to an orientation film of the LC device. The effect of the addition of the charge transporting material was discovered through the following experiments and investigations:

First, taking note of the undesirable results obtained when a plurality of highly symmetric Chinese characters are displayed on the same display surface of the LC device, the inventors considered that the crosstalk of the second kind is probably due to differences in the number of pulsed voltages applied to the LC device, particularly each picture element thereof, during the multiplexing drive of the device. To confirm this assumption, the inventors made the display of line image as shown in FIG. 1. Namely, to produce differences in the number of pulsed voltages applied to each picture element, the line image 3 was displayed on a display surface 1, wherein the image 3 had five different patterns and each pattern was on every other line. The number of the image lines in each pattern corresponds to the number of pulsed voltages applied to the LC device to display the line image. The transmittance (T) was determined with different applied voltages (V) on the sites "a", "b", "c", "d", and "e" of the background area 2 of the display surface 1, and the results were as plotted in FIG. 2, which is a graph showing the relationship between the applied voltage and the transmittance. The V−T characteristic curve of FIG. 2 shows that, although the V−T curve should be constant at all sites "a" to "e" it is shifted to a high voltage side with an increase of the number of image lines displayed.

The inventors further considered, from the results of the above investigation, that the shifting of the V−T curve strongly depends on both the amplitude and frequency of the applied voltage or drive voltage, and on the LC material used. Therefore, assuming that a charge adsorption layer exists in the LC device, it was assumed that the effective voltage applied to the LC material of the device is lowered because some of the voltage outernally-applied to the LC material also acts on the charge adsorption layer, and accordingly, a luminance of the display surface of the device is reduced. Based on these findings, the inventors found an approach to the present invention whereby the shifting of the V−T curve and thus generation of the crosstalk of the second kind can be eliminated if the formation of the charge adsorption layer, i.e., electric bilayer, is prevented.

Figure 3:
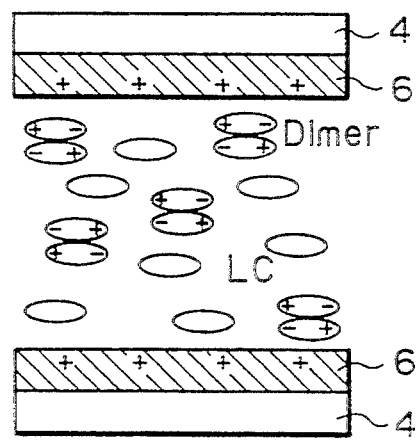
FIG. 3 is a schematic cross-sectional view showing the presence of dimers in the LC layer of the device.
Figure 4A:
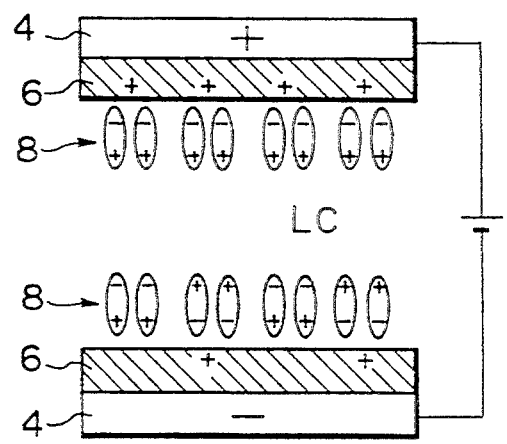
FIGS. 4A and 4B are each schematic cross-sectional views showing the electric bilayer induced by the decomposition of the LC dimers of FIG. 3.
Figure 4B:
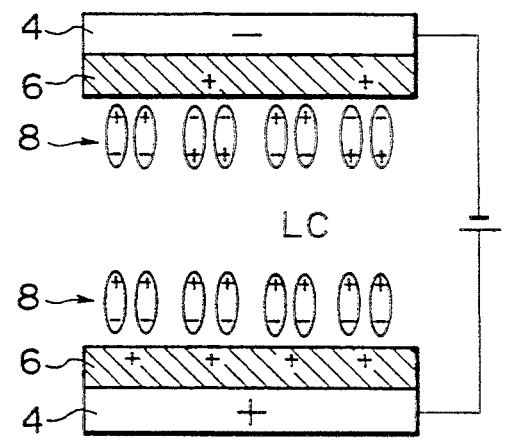

More particularly, the electric bilayer is formed in accordance with the following mechanisms. First, as shown in FIG. 3, the illustrated LC device or panel contains two opposed substrates 4 each having an orientation film (e.g., polyimide) 6, and a LC material is sandwiched between the opposed orientation films 6. The LC materials, particularly those having a high polarizability, typically cyanobiphenyl, have a tendency to form dimers (see, FIG. 3). On the other hand, the orientation films 6 contain stable cation radicals which were produced as a result of sintering at an elevated temperature during the film formation process. It is considered that the dimers are isolated under humid conditions, for example, and the isolated dimers are then adsorbed on the orientation films, by an interaction between the dimers and orientation films. Therefore, as shown in FIG. 4A or 4B, electric bilayers 8 of dimers are formed in the vicinity of the orientation films 6. A certain level of electric charge is accumulated in the electric bilayers 8, and causes a shifting of the V−T curve, and thus the second crosstalk, as a result of a generation of current peaks having a reversed polarity.

Figure 5:
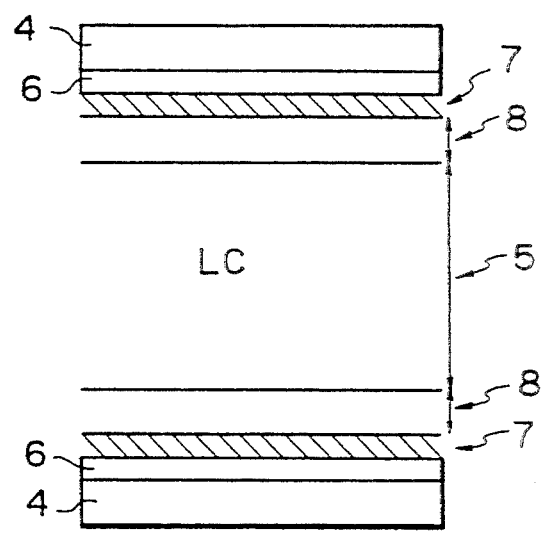
FIG. 5 is a schematic cross-sectional view showing the formation of electric bilayers in the LC device.

The formation of the electric bilayers in the LC devices is also shown in FIG. 5, in which an electric bilayer 8 is formed between the LC material 5 and the orientation film 6, through an anchoring layer 7.

Figure 6:
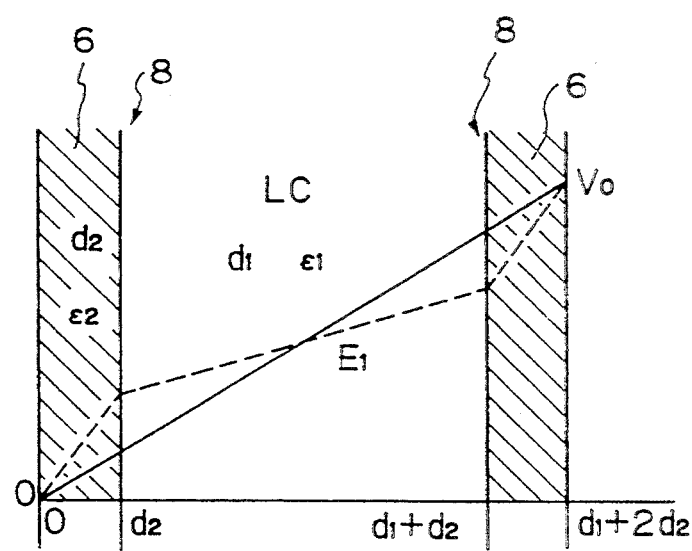
FIG. 6 is a graph schematically showing a variation in the effective applied voltage of the LC device.

The variation in the effective applied voltage of the LC device is apparent from FIG. 6, in which reference numeral 6 indicates an orientation film and 8 indicates an electric bilayer as in the above figures. The effective voltage (or depolarization field) $E_1$ should be the illustrated solid line, but in practice, is as represented by the dotted line. The graph of FIG. 6 was plotted by using the following equation:

$$E_1(t) = -\frac{\epsilon_2 V_0}{2\epsilon_1 d_2 + \epsilon_2 d_1} + \frac{2d_2(\sigma_d(t) + \sigma_b(t))}{2\epsilon_1 d_2 + \epsilon_2 d_1}$$

in which $E_1(t)$ is a depolarization field, $\epsilon_1$ and $d_1$ are a dielectric constant of the LC material and a thickness of the LC layer, $\epsilon_2$ and $d_2$ are a dielectric constant of the orientation film and a thickness thereof, $V_0$ is an applied external voltage, $\sigma_d(t)$ is a charge density accumulated due to the presence of ions on the interface between the orientation film and the LC layer, and $\sigma_b(t)$ is a charge density accumulated due to the presence of the electric bilayer on the interface between the orientation film and the LC layer. In this connection, it should be noted that the system or LC device showing a large transient current results in the second kind of crosstalk, and the origin of this phenomenon may be explained by the occurrence of the depolarization field (see, above equation) originating from the space charge. Further, the amount of space charge strongly depends on the amplitude and frequency of the applied voltage, since the temporal behavior of the buildup of the space charge may depend on the waveform of the voltage.

From the results of the above-described experiments and investigations, the inventors found that although the formation of the electric bilayers should be prevented, this is generally impossible, and further, the generation of the cation radicals in the orientation film such as polyimide is generally unavoidable. Accordingly, the inventors found an approach to the present invention whereby, since a temporary accumulation of the electric charge in the vicinity of the orientation film is essential to the LC device and therefore is not avoidable, the best and most effective way of causing a rapid leakage of the accumulated electric charge, is by doping a certain charge transporting material in the orientation film of the LC device.

The liquid crystal display device according to the present invention can be driven in accordance with any conventional display mode, such as a simple matrix address system or an active matrix address system using thin-film transistors (hereinafter TFTs), and therefore, may have a different structure depending on the specific display mode. When the simple matrix address system is adopted, the LC device preferably has a panel structure and comprises a first glass substrate having stripe electrodes and an orientation film formed in sequence on a surface of the substrate, an opposed second glass substrate having stripe electrodes, perpendicular to the longitudinal direction of the stripe electrodes of the first glass substrate, and an orientation film formed in sequence on a surface of the substrate, and a liquid crystal material sandwiched between the opposed orientation films of the first and second substrates. The first electrodes on the first substrate and the second electrodes on the second substrate each are designed for scanning signals and data signals.

The first and second electrodes are transparent stripe electrodes and cross each other. These electrodes are generally supported on a transparent substrate such as a glass substrate, and are preferably deposited on the substrate by a well-known deposition method such as sputtering. A typical example of usable electrode materials includes indium oxide ($In_2O_3$) or indium-tin oxide (ITO).

If necessary, a dielectric layer may be sandwiched between the electrode and the substrate. The dielectric layer used between the electrode and substrate may be formed from any dielectric material, as long as the material can effectively act as the capacitative element. The dielectric layer is preferably a flat overcoat layer having an uniform thickness, and is preferably deposited on the substrate by a well-known deposition method such as sputtering or chemical vapor deposition (CVD), as for the deposition of the electrodes. Typical examples of usable dielectric materials include magnesium oxide (MgO) or tantalum oxide ($Ta_2O_5$).

The liquid crystal material used in the LC device of the present invention can be optionally selected from a plurality of well-known liquid crystal materials, such as twisted nematic (TN) liquid crystals, phase transition type liquid crystals, super twisted nematic (STN) liquid crystals, and ferroelectric liquid crystals. Among these liquid crystals, the STN-LCs and FLCs are preferably used. For example, the STN-LCs can be prepared by blending a nematic liquid crystal (ZLI-2299 commercially available from Merck Co.) with a chiral-nematic liquid crystal (S-811 commercially available from Merck Co.). Typical examples of other useful STN-LCs include the following compositions:

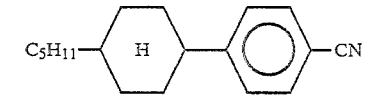

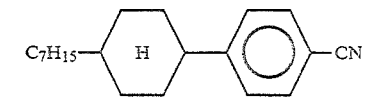

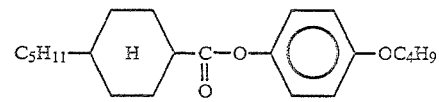

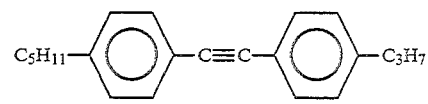

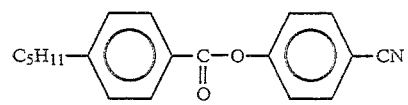

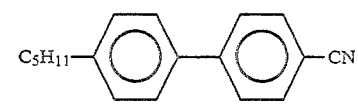

Similarly, the FLCs can be prepared by blending two or more commercially available liquid crystals, and typical examples of useful FLCs include the following compositions:
Composition A
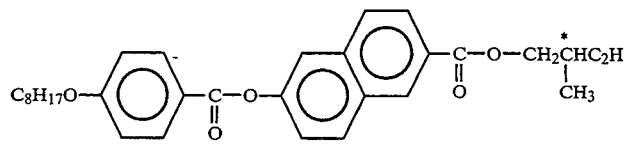
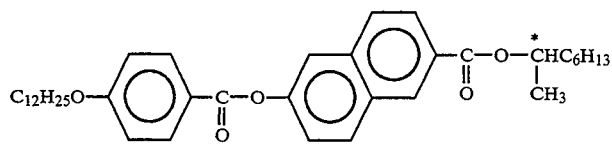
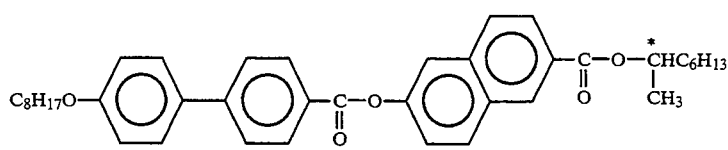
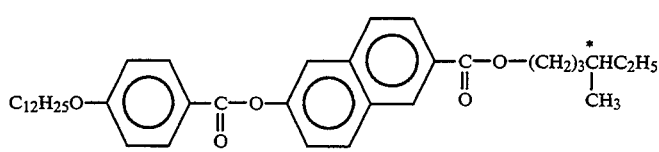
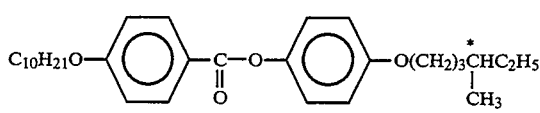
Composition B
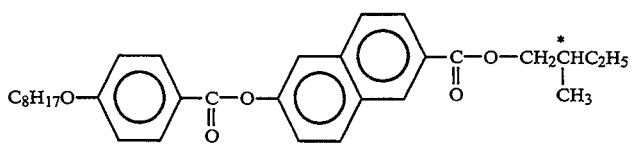
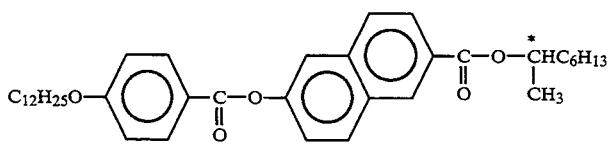
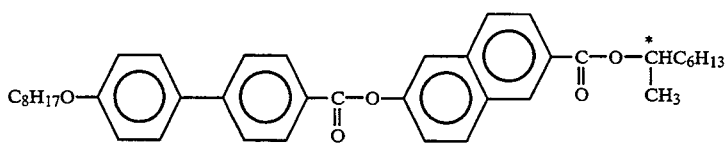
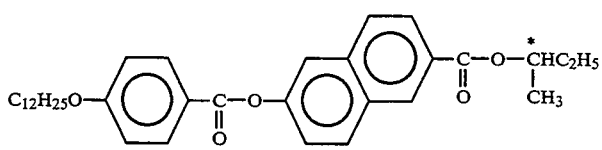

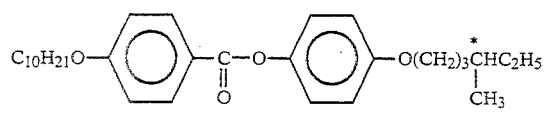
Composition C
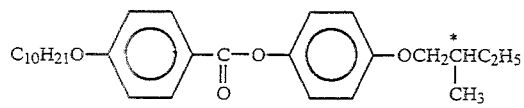
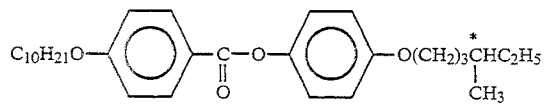
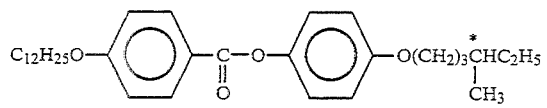
Composition D
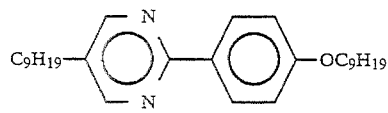
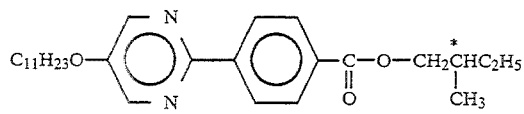
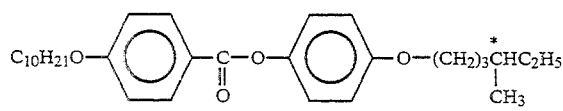
Composition E
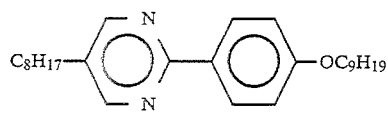
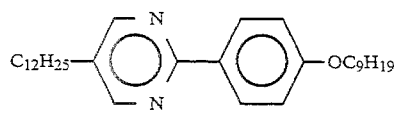
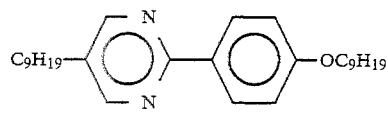
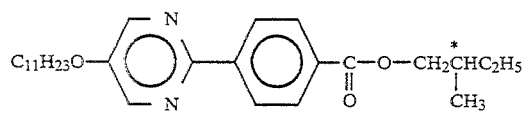
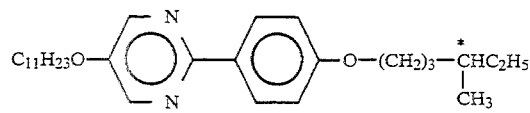

in which C* denotes a chiral carbon atom. The compositions A, B and C are described in Japanese Unexamined Patent Publication (Kokai) No. 1-101389.

In the liquid crystal display device of the present invention, the orientation film in which an electron transporting material is doped may be formed from any conventional materials, such as polymeric materials, for example, polyimide, polyvinyl alcohol or derivatives thereof, or other materials such as silicon oxide. Preferably, a layer of polyimide is used as the orientation film. The orientation film may be formed by any film-forming method, such as spin-coating or screen printing. The thickness of the orientation film can be widely varied, but in general is from about 0.5 μm to about 0.8 μm.

According to the present invention, the charge transporting material is doped in the orientation film to reduce or eliminate the crosstalk problems of the LC device. Doping of the charge transporting material can be attained by adding the charge transporting material to a solution or others for use in the formation of the orientation film. The level of the doped charge transporting material can be widely varied depending upon various factors such as the specific LC material, specific material of the orientation film, specific charge transporting material, drive voltage applied and the like, but in general is in about 0.1% by weight to about 5% by weight, preferably about 0.5 to 1.0% by weight, with regard to the total weight of the orientation film.

The charge transporting material is one conventionally used in the field of electrophotography. Namely, this material is generally used as a main component of the charge transporting layer on an electrically conductive substrate such as a photoconductor drum, and can transport carriers generated in a charge generation layer to a surface of the charge transporting layer, to thereby form an electrostatic image on the substrate. According to the present invention, this charge transporting material is dispersed in an orientation film of the LC device, to remove electric charges accumulated in the layer, thereby eliminating the crosstalk in the LC device.

A wide variety of charge transporting materials which are well-known in the art can be used in the practice of the present invention, and suitable charge transporting materials include, for example, a hole-transporting material represented by the general formula (I):

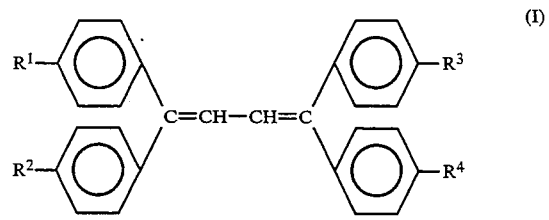

in which
R$^1$, R$^2$, R$^3$ and R$^4$ each independently represent a hydrogen atom, an alkyl group of 1 to 4 carbon atoms, or an alkylamino group wherein an alkyl moiety contains 1 to 4 carbon atoms and may be substituted;
a hole-transporting material represented by the general formula (II):

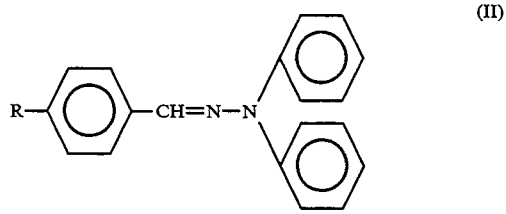

in which
R represents a hydrogen atom, an alkyl group of 1 to 4 carbon atoms, or an alkyl- or dialkylamino group wherein an alkyl moiety contains 1 to 4 carbon atoms and may be substituted; and
an electron-transporting material represented by the general formula (III), i.e., 2,4,7-trinitrofluorenone:

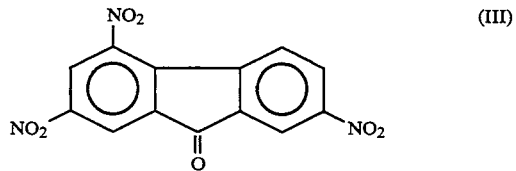

Typical example of useful charge transporting materials, including those of the above formulae (I), (II) and (III), are:

CTM-1:

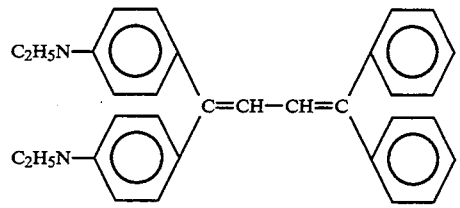

CTM-2:

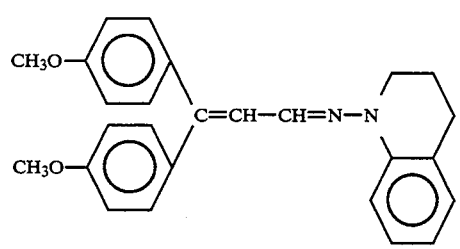

-continued
CTM-3:
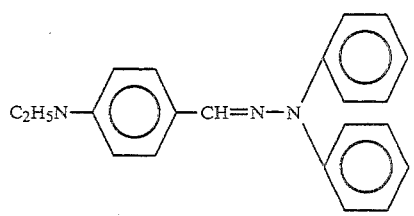
CTM-4:
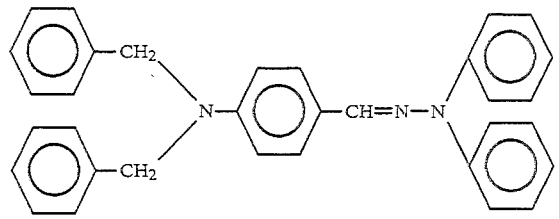
CTM-5:
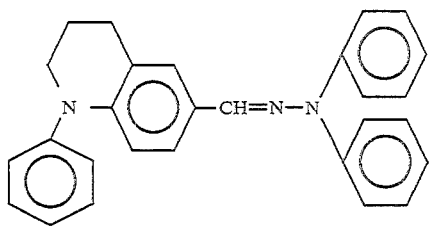
CTM-6:
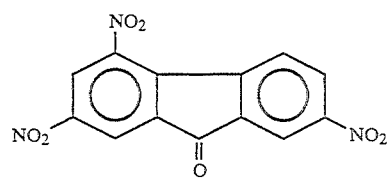
CTM-7:
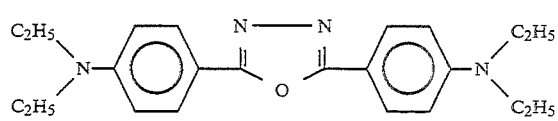
CTM-8:
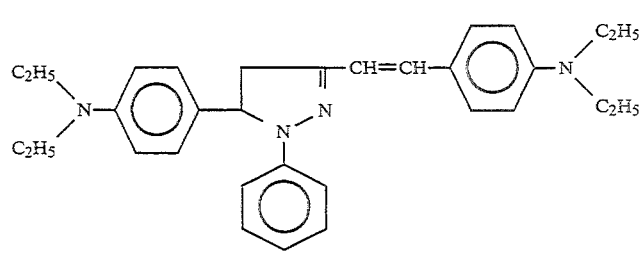
CTM-9:
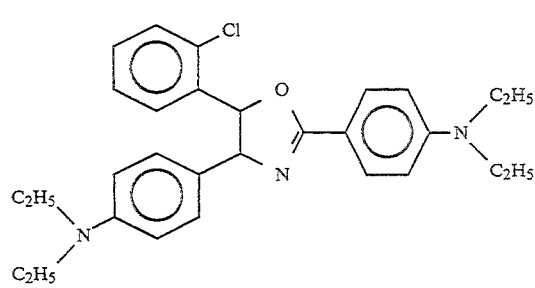

CTM-10:
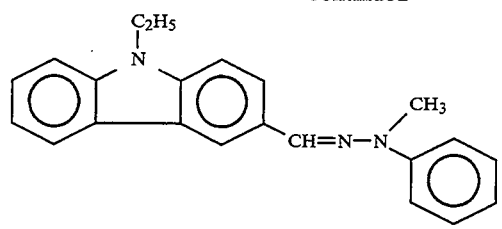
CTM-11:
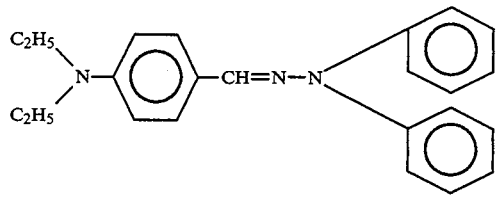
CTM-12:
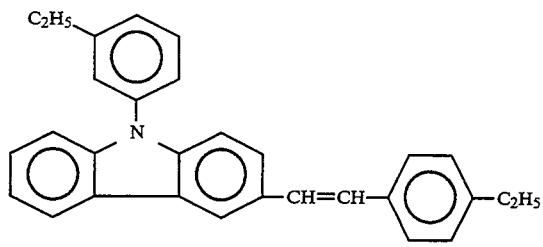
CTM-13:
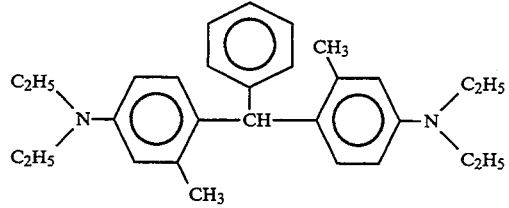
CTM-14:
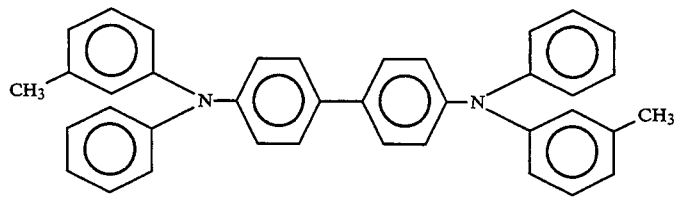
CTM-15:
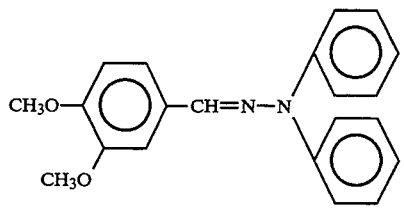
CTM-16:
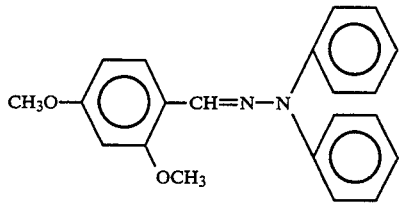

CTM-17: 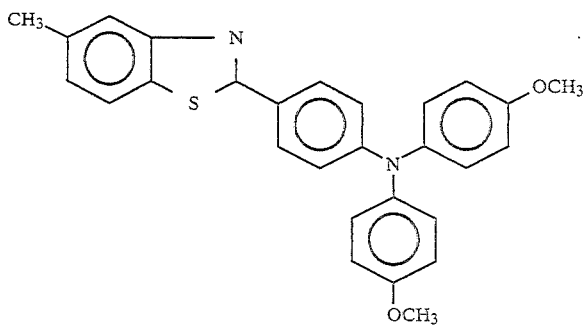

CTM-18: 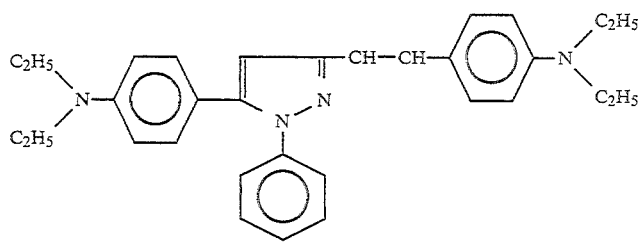

CTM-19: 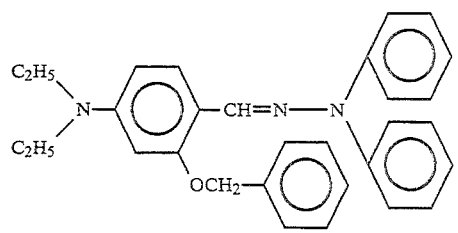

CTM-20: 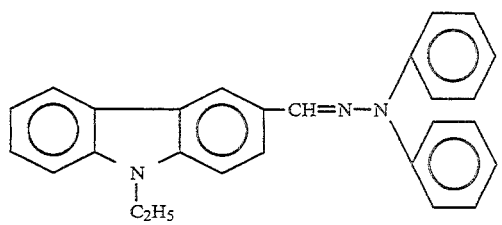

CTM-21: 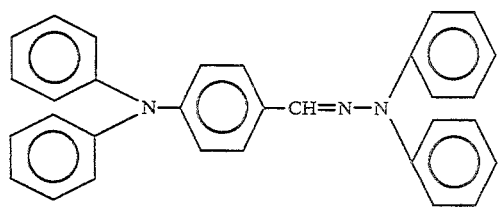

CTM-22: 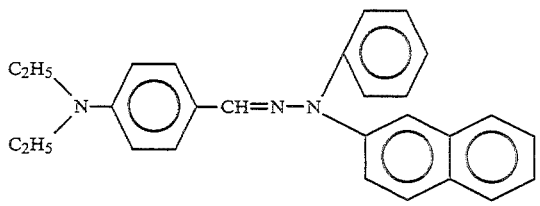

These and other charge transporting materials may be used separately or as a mixture of two or more thereof.

Figure 7:
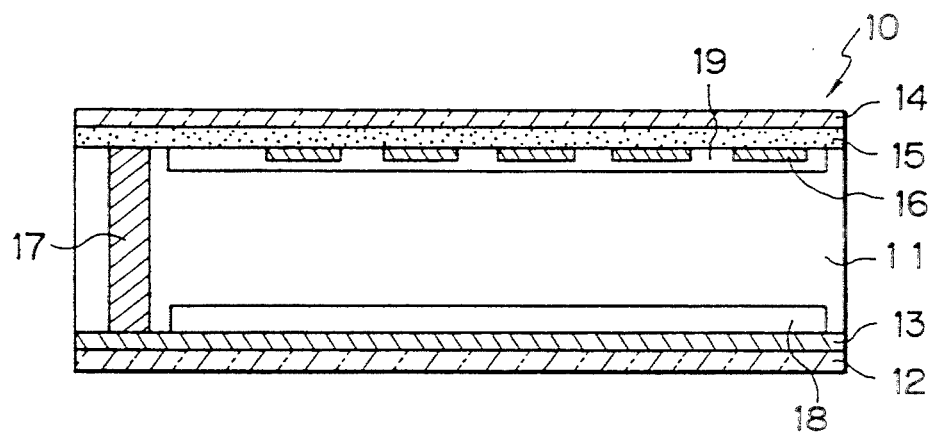
FIG. 7 is a cross-sectional view of the STN-LC device according to a preferred embodiment of the present invention.

As previously mentioned, the liquid crystal display device of the present invention may have any different structure. For example, the STN-LC device of the present invention may have the panel structure as illustrated in FIG. 7. The illustrated LC device 10 contains a first glass substrate 12 having a first transparent electrode 13 such as transparent conductive coating, for example, $IN_2O_3$, and an orientation film 18 such as a polyimide rubbing layer applied thereon in sequence. The LC device 10 also contains a second glass substrate 14 having a dielectric layer 15 as a capacitor, such as an MgO coating (or, for example, Ta$_2$O$_5$ sputtering coating), a second transparent electrode 16 such as In$_2$O$_3$, and an orientation film 19 such as a polyimide rubbing layer, applied thereon in sequence. The transparent electrodes used herein as the first and second electrodes are X–Y crossed stripes, and a super twisted nematic liquid crystal 11 is sandwiched between these transparent electrodes to form an STN-LC panel 10. Further, the LC panel 10 contains a conductive means 17 such as Ag paste (or, for example, carbon paste or anisotropic conductive resin materials capable of exhibiting an electrical conductivity in a certain direction and an electrical insulating property in a direction perpendicular to said direction) for electrically connecting the dielectric layer 15 to the first transparent electrode 13.

Figure 8:
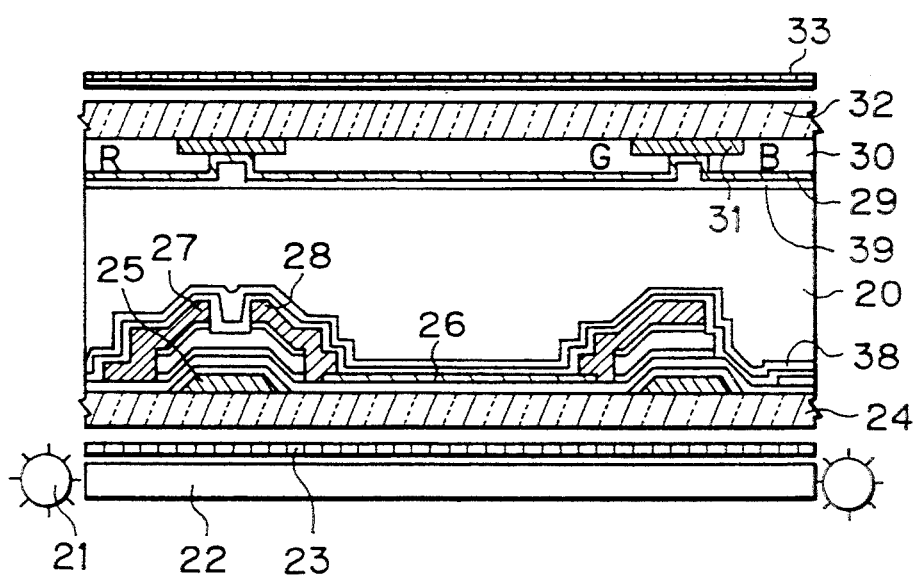
FIG. 8 is a cross-sectional view of the TFT-LC device according to another preferred embodiment of the present invention.

Further, the TFT-LC device of the present invention may have the panel structure as illustrated in FIG. 8. In the illustrated TFT-LC device, a light source 21 is a fluorescent lamp from which the light is guided, in sequence, through a light guide 22 and a polarizer 23 to the TFT-LCD. As illustrated, a glass substrate 24 of the device has a TFT fabricated thereon. The TFT contains a gate electrode 25, source area 27, and drain area 28, as well as a display electrode 26 of indium-tin oxide (ITO). Another glass substrate 32 of the device has a black matrix 31, color filter 30, and counter electrode 29 of ITO coated in sequence thereon. Another polarizer 33 is disposed over the substrate 32. A twisted nematic (TN) liquid crystal 20 is sandwiched between the electrodes 26 and 29. In this device, the charge transporting material-doped orientation films 38 and 39 according to the present invention are applied over the electrodes 26 and 29, respectively. The TFT-LC device provided with an orientation film containing the doped charge transporting material is especially effective for diminishing or eliminating undesirable after-images.

To assist in a further understanding thereof, the present invention will be described with reference to working examples thereof. Note, these examples do not restrict the scope of the present invention.

EXAMPLE 1

The STN-LC device with the picture elements (640×400) was produced as follows: A glass plate having a surface area of 300×280 mm was polished to produce a glass substrate, and a transparent electrode of ITO was then sputtered onto the glass substrate. The transparent electrode formed had a line pattern of 100 stripes having a pitch of 0.35 mm, width of 335 μm, interval or distance of 15 μm, and a resistivity value of 10 Ω/cm$^2$. Then, one surface of each transparent electrode was coated with an orientation film of polyimide. The formation of the orientation film was made by dissolving polyimide ("SE-610", commercially available from Nissan Chemical Co.) in N-methyl-pyrolidone, admixing the resulting coating solution of polyimide with 0.5% by weight of the charge transporting material (CTM-1) of the formula:

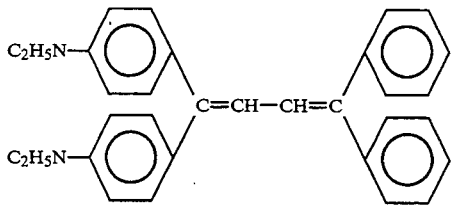

and transfer-printing the mixture onto the glass substrate. The printed mixture was dried at 250° C. for one hour to obtain a hard orientation film. The orientation film was further subjected to an antiparallel rubbing, in advance, to obtain an LC panel having a twist angle of 260°.

A mixed STN-LC was prepared by blending a nematic LC ("ZLI-2293", Merck Co.) with a chiralnematic LC ("S-811", Merck Co.), and this LC was filled in a gap of the LC panel.

After a polarization film was applied to the STN-LC panel on a parallel Nicol apparatus, a transmittance thereof was determined by applying different voltages, to obtain the V−T characteristic curve. For this determination, a white light source was disposed on a back surface side of the LC panel, and a luminance meter was disposed on a front surface side of the LC panel. The drive voltage applied to the LC panel was scanned to plot the corresponding variation in the luminance. In this determination, the drive voltage applied to the LC panel was adjusted to show a most suitable bias ratio at a duty ratio of 1/200.

Figure 9:
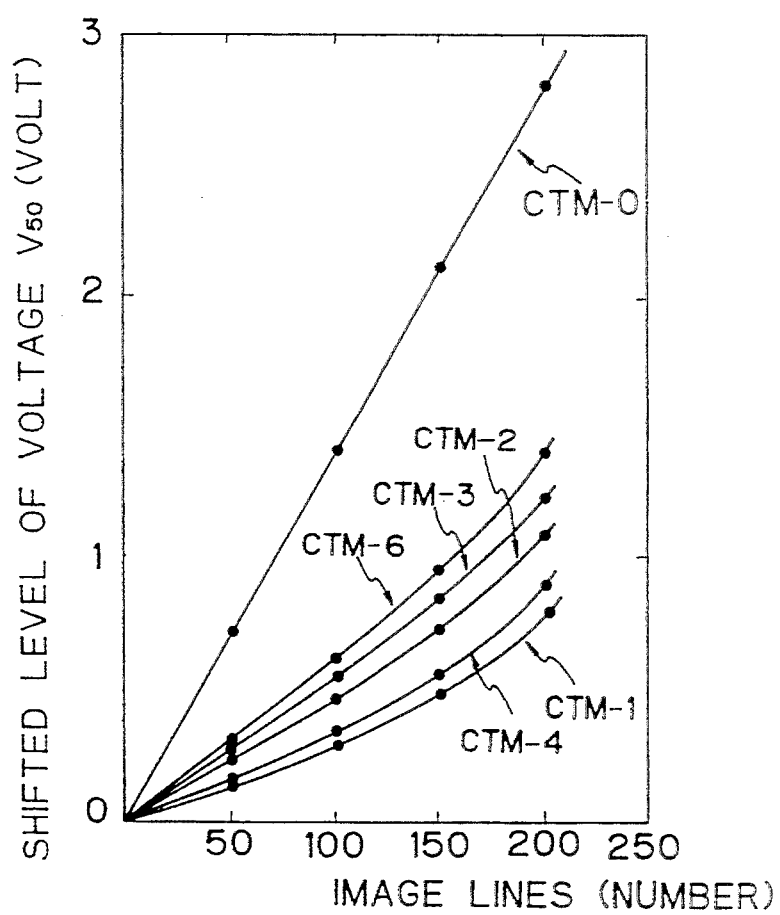
FIG. 9 is a graph showing the relationship between the lines of the displayed image and the shifted level of voltage obtained from the appended working examples.

Further, this determination was made at five sites "a", "b", "c", "d", and "e", as described previously with reference to FIG. 1. Herein, a voltage necessary to obtain an intermediate luminance between the minimum luminance and maximum luminance was regarded to as the voltage V$_{50}$ for each displayed image line. Furthermore, a variation or shift of the voltage V$_{50}$ depending on the variations in the displayed image lines (number) was determined from the voltage V$_{50}$ when an image line was not displayed, as a standard. The results are shown in FIG. 9 (see, line CTM-1).

EXAMPLE 2

The procedure of Example 1 was repeated except that the charge transporting material was replaced with the following charge transporting materials:

CTM-2:

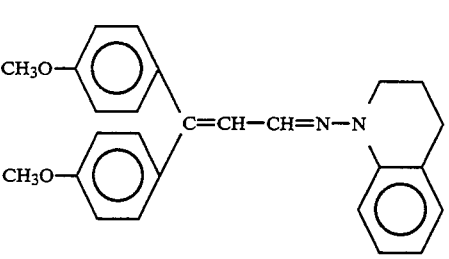

CTM-3:

-continued

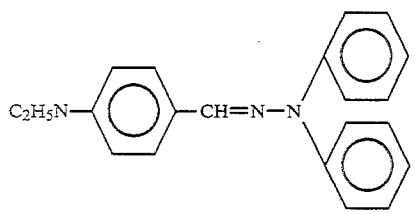

CTM-4:

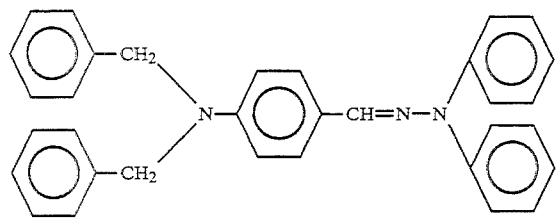

CTM-6:

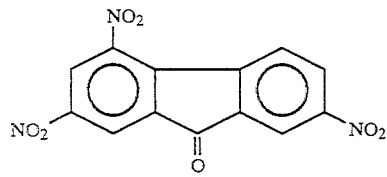

The results are shown in FIG. 9 (see, lines CTM-2, CTM-3, CTM-4 and CTM-6).

EXAMPLE 3

This is a comparative example.

The procedure of Example 1 was repeated except that, for a comparison, the charge transporting material was not doped in the orientation film of polyimide. The results are also shown in FIG. 9 (see, line CTM-0).

The results of FIG. 9 indicate that the doping of the charge transporting material in the orientation film according to the present invention significantly lowers the shift level of the voltage $V_{50}$, and thus the external drive voltage can be applied to the LC material of the device without the voltage loss induced due to a formation of an electric bilayer, and thus this the crosstalk problem frequently found in the STN-LCs is removed.

We claim:

1. A liquid crystal display device which comprises an orientation film and at least one charge transporting material doped in the orientation film in an amount sufficient to cause leakage of an electric charge temporarily accumulated in the orientation film and in a vicinity of the orientation film during operation of the liquid crystal display device, the orientation film exhibiting an electrically insulating characteristic under a direct current electric field, and an electrically conductive characteristic under high frequency electric field, wherein the charge transporting material is a material selected from the group consisting of the following general formulae:

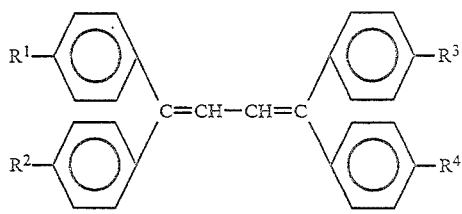

in which $R^1$, $R^2$, $R^3$ and $R^4$ each independently represent a hydrogen atom, an alkyl group of 1 to 4 carbon atoms, or an alkylamino group wherein an alkyl moiety contains 1 to 4 carbon atoms and may be substituted;

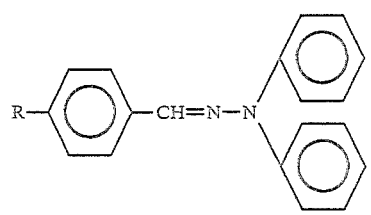

in which R represents a hydrogen atom, an alkyl group of 1 to 4 carbon atoms, or an alkyl- or dialkyl-amino group wherein an alkyl moiety contains 1 to 4 carbon atoms and may be substituted;

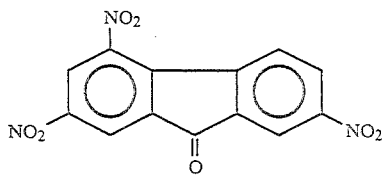

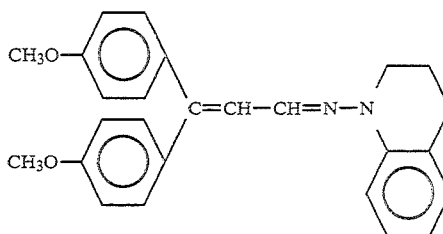

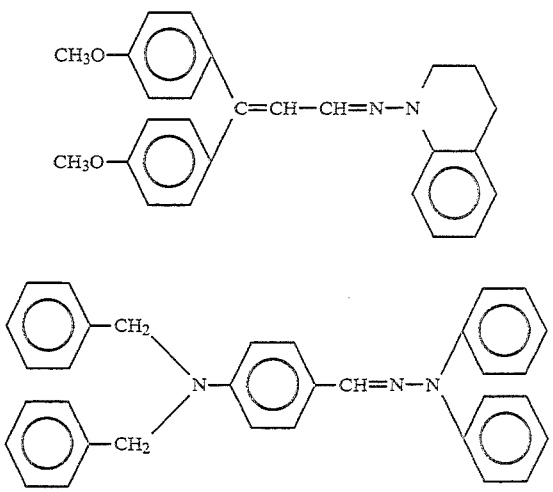

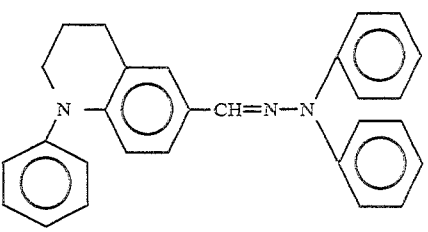

-continued
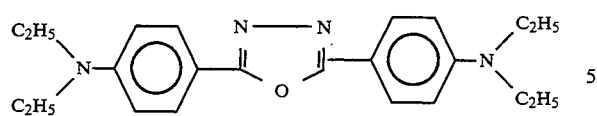
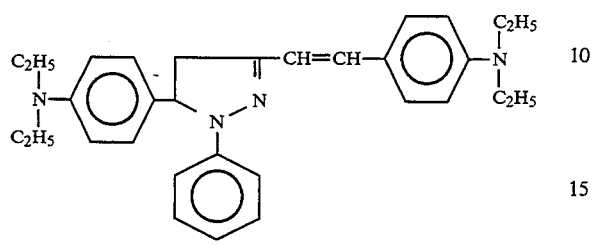
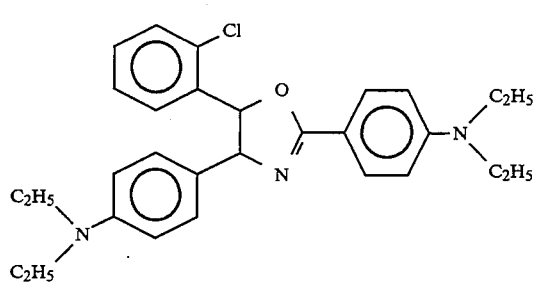
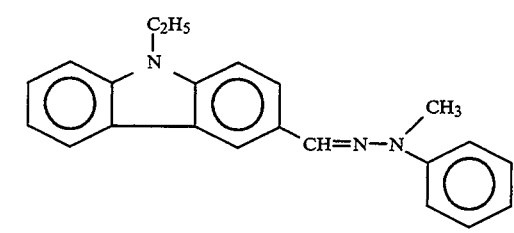
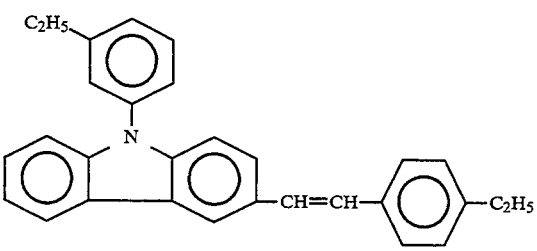
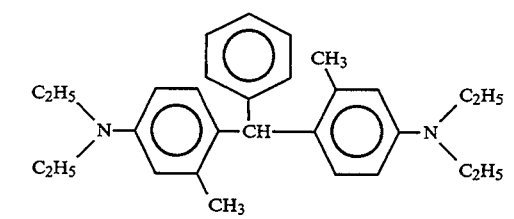
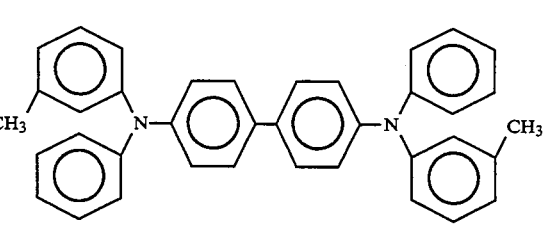
-continued
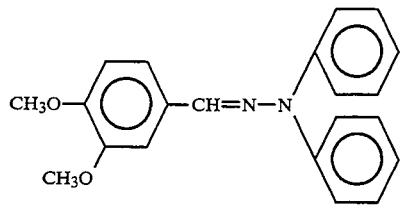
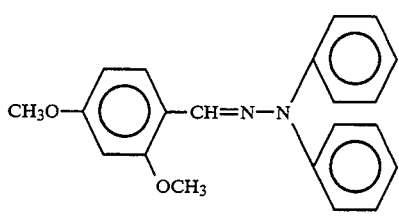
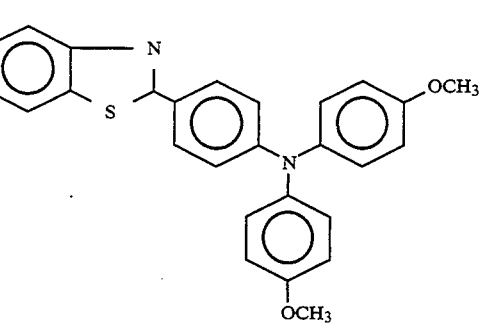
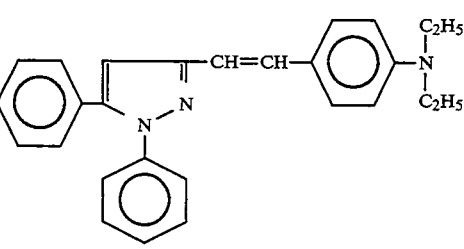
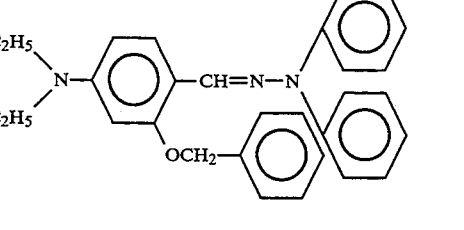
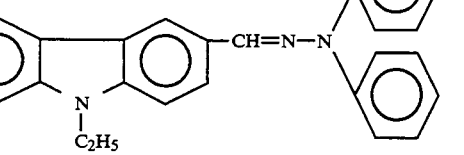

-continued

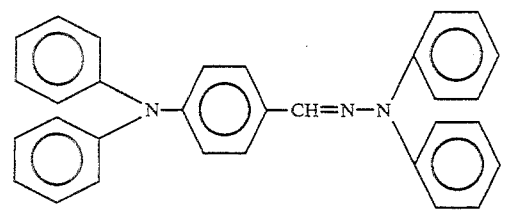

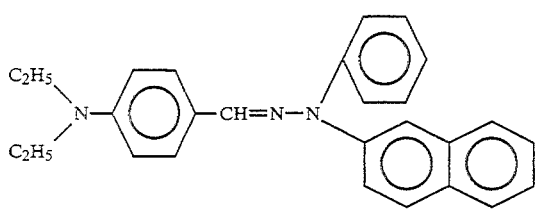

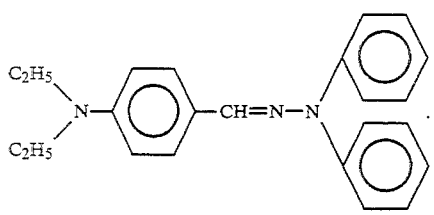

2. A liquid crystal display device according to claim 1, in which the orientation film is a layer of polyimide.

3. A liquid crystal display device according to claim 2, in which the liquid crystal material used in the liquid crystal display device is a super twisted nematic liquid crystal.

4. A liquid crystal display device according to claim 2, wherein said liquid crystal display device connects to a simple matrix address system.

5. A liquid crystal display device according to claim 4, which has a panel structure, and comprises:
  a first glass substrate having first stripe electrodes on a first surface in a longitudinal direction,
  an orientation film formed in sequence on the first surface of the first glass substrate,
  a second glass substrate opposed to the first glass substrate and having second stripe electrodes on a first surface, perpendicular to the longitudinal direction of first stripe electrodes of the first glass substrate,
  an orientation film formed in sequence on the first surface of the second glass substrate, and
  a liquid crystal material sandwiched between the orientation films of the first and second glass substrates.

6. A liquid crystal display device according to claim 2, further comprising thin-film transistors formed on a substrate of the liquid crystal display device between the substrate and the orientation film, to drive the charge transporting material in response to an active matrix address system.

7. A liquid crystal display device according to claim 1, in which the liquid crystal material used in the liquid crystal display device is a super twisted nematic liquid crystal.

8. A liquid crystal display device according to claim 1, wherein said liquid crystal display device connects to a simple matrix address system.

9. A liquid crystal display device according to claim 4, which has a panel structure, and comprises:
  a first glass substrate having first stripe electrodes on a first surface in a longitudinal direction,
  an orientation film formed in sequence on the first surface of the first glass substrate,
  a second glass substrate opposed to the first glass substrate and having second stripe electrodes on a first surface, perpendicular to the longitudinal direction of the first stripe electrodes of the first glass substrate,
  an orientation film formed in sequence on the first surface of the second glass substrate, and
  a liquid crystal material sandwiched between the orientation films of the first and second glass substrates.

10. A liquid crystal display device according to claim 1, further comprising thin-film transistors, formed on a substrate of the liquid crystal display device between the substrate and the orientation film, to drive the charge transporting material in response to an active matrix address system.

11. A liquid crystal display device according to claim 1, wherein said charge transporting material is doped in an amount about 0.1% to about 5% of the weight of said orientation film.

12. A liquid crystal display device according to claim 11, wherein said charge transporting material is doped in an amount about 0.5% to about 1.0% of the weight of said orientation film.

13. A liquid crystal display device according to claim 1, having a panel structure comprising:
  a first glass substrate;
  a thin-film transistor having a gate electrode, a source area and a drain area, the thin-film transistor being connected to a first electrode and formed on the first glass substrate, a first portion of the orientation film being formed over the first glass substrate, the first electrode and the thin-film transistor;
  a second glass substrate;
  a black matrix;
  a color filter;
  a counter electrode, the black matrix, color filter and counter electrode being formed in sequence on the second glass substrate, a second portion of the orientation film being formed over the second glass substrate, black matrix, color filter and counter electrode; and
  a liquid crystal material sandwiched between the first and second portion of the orientation film.

* * * * *